United States Patent [19]
Carlson et al.

[11] 3,749,500
[45] July 31, 1973

[54] OPTICAL CALIPER AND EDGE DETECTOR-FOLLOWER FOR AUTOMATIC GAGING
[75] Inventors: Gerald J. Carlson, Scotia; Harry R. Summerhayes, Schenectady, both of N.Y.
[73] Assignee: General Electric Company, Schenectady, N.Y.
[22] Filed: Dec. 23, 1970
[21] Appl. No.: 100,854

[52] U.S. Cl.... 356/156, 250/219 WD, 250/219 TH, 356/160, 356/167
[51] Int. Cl. ............................................ G01b 11/00
[58] Field of Search.............. 250/219 WD, 219 LG, 250/219 TH; 356/156, 159, 160, 167

[56] References Cited
UNITED STATES PATENTS

| 2,670,651 | 3/1951 | Burns et al. | 356/160 |
| 3,565,531 | 2/1971 | Kane et al. | 250/219 TH X |
| 3,612,890 | 10/1971 | Cornyn et al. | 250/219 TH X |
| 2,237,811 | 4/1941 | Cockrell | 250/219 WD X |
| 2,514,985 | 7/1950 | Banner | 250/219 WD X |
| 2,810,316 | 10/1957 | Snyder | 356/159 |
| 3,486,828 | 12/1969 | Nickell et al. | 356/159 X |
| 2,812,685 | 11/1957 | Vossberg | 356/160 |

FOREIGN PATENTS OR APPLICATIONS

| 300,472 | 9/1965 | Netherlands | 250/219 WD |
| 59,943 | 1/1968 | Germany | 356/159 |

Primary Examiner—Ronald L. Wibert
Assistant Examiner—F. L. Evans
Attorney—John F. Ahern, Paul A. Frank, Julius J. Zaskalicky, Donald R. Campbell, Frank L. Neuhauser, Oscar B. Waddell and Joseph B. Forman

[57] ABSTRACT

An automatic optical caliper for gaging linear dimensions of objects employs a pair of independently adjustable laser light beams, forming the arms of the caliper, that seek opposite edges of the object. Each light beam is sensed by a photodetector moving in synchronism with the beam, and the output signal controls a servo feedback system to position the beam to be partially interrupted by one edge of the object. The distance between the two light beams so positioned is measured by electronic or optical techniques and is the desired measurement. Preferably the light transmitted past the object edge is detected, but backscattered light reflected by the object can be detected instead. Typical applications are to accurately gage a workpiece diameter without knowledge of the position of the center, and profile gaging of the workpiece. A different embodiment employs only one gaging light beam positioned initially at a reference edge and subsequently at another edge, the distance between the two positions being the desired measurement. An application is to gage tool wear.

7 Claims, 17 Drawing Figures

PATENTED JUL 31 1973

Inventors
Gerald J. Carlson
Harry R. Summerhayes
by Ronald R. Campbell
Their Attorney ← Gage Movement Inventors
Gerald J. Carlson
Harry R. Summerhayes
by Donald R. Campbell
Their Attorney

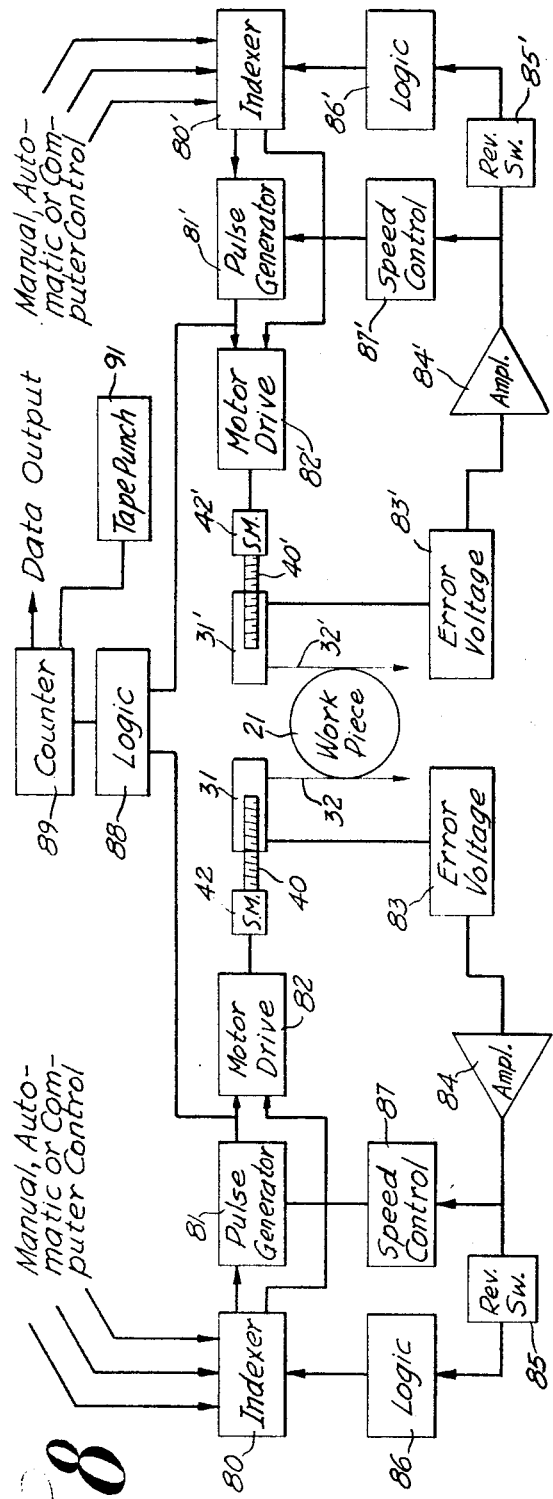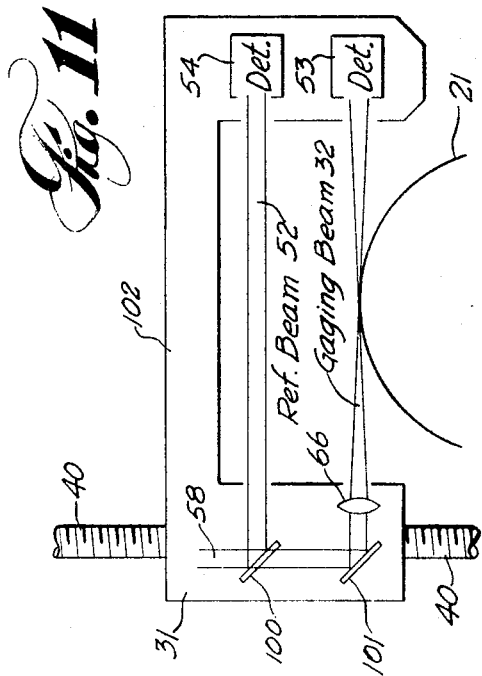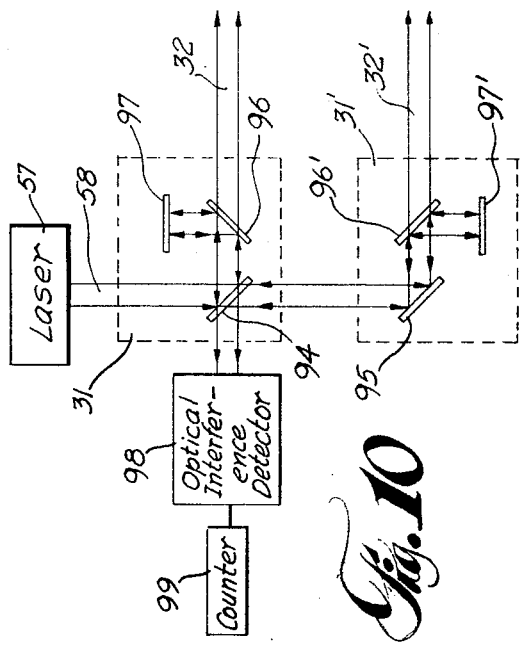

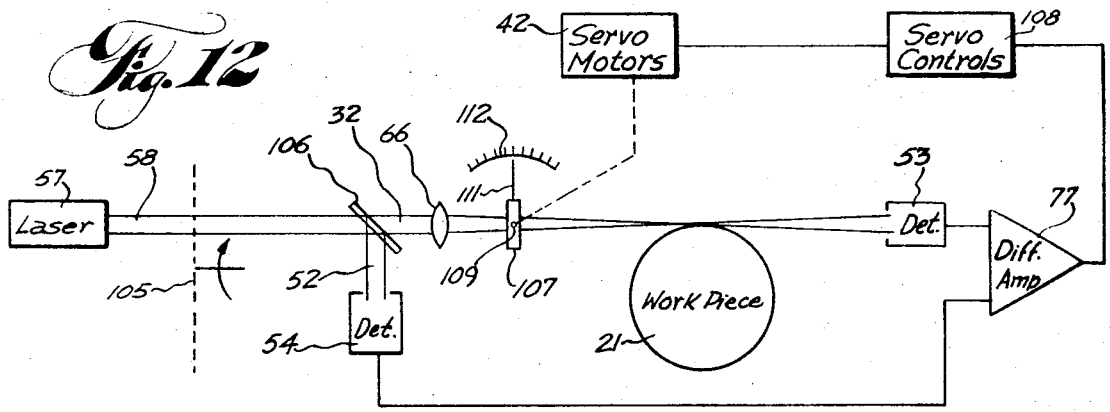
Fig. 12
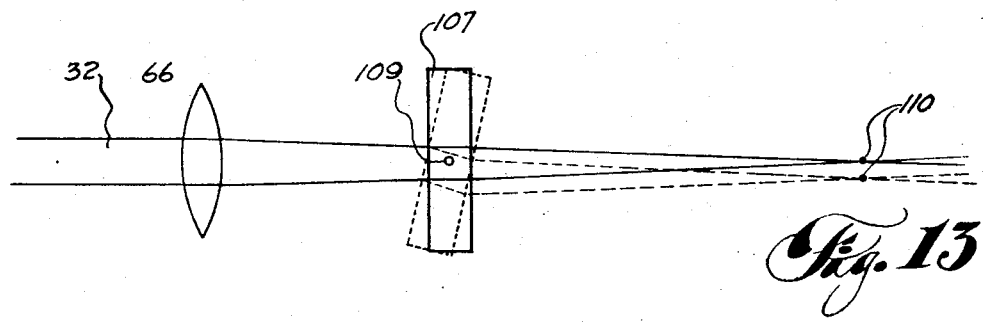
Fig. 13
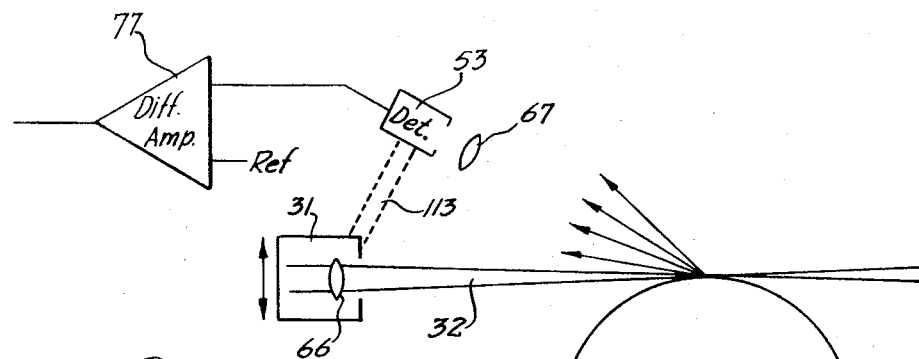
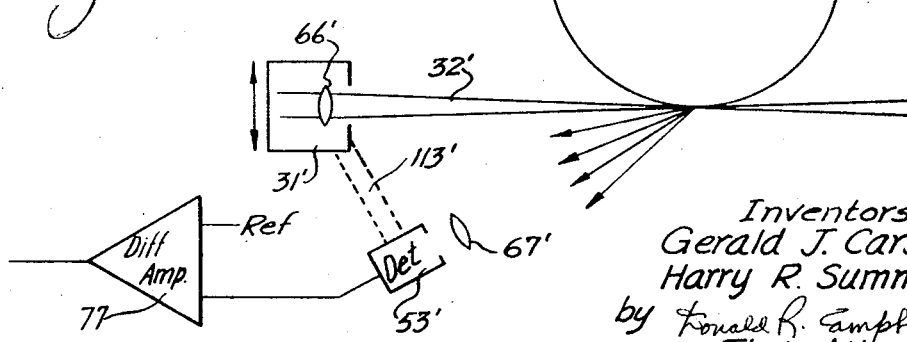
Fig. 14
Inventors
Gerald J. Carson
Harry R. Summerhayes
by Ronald R. Campbell
Their Attorney Inventors
Gerald J. Carlson
Harry R. Summerhayes
by Donald R. Campbell
Their Attorney

OPTICAL CALIPER AND EDGE DETECTOR-FOLLOWER FOR AUTOMATIC GAGING

BACKGROUND OF THE INVENTION

This invention relates to optical gages for measuring linear dimensions, and more particularly to an optical caliper and to an edge detector and follower especially suitable in machining operations for the automatic gaging of diameters and other dimensions.

Improved techniques are needed in the general field of automatic gaging by way of providing accurate in-process and on-machine measurements without interfering with the process or operation. Furthermore, an automatic gage is needed that combines in one device more of the desirable features required for a particular class of applications. In a machining or turning application, to which the preferred embodiment of the present invention is directed, a common use for automatic gaging is to measure the diameter of a turned part such as a shaft. It is evident that automatic gaging is much faster than manually calipering the part or using a tape measure to determine its circumference, and minimizing the gaging down time becomes more significant with the increasing cost and complexity of lathes and other machine tools. In line with this objective, the gaging should be capable of being performed on the machine with the part either rotating or not rotating, rather than having to remove the part from the machine. Another desirable feature is to make all measurements relative to the part rather than to some reference point on the machine, since the machine bed can move slightly under the load of cutting. The gage also performs independent of many other normal sources of error such as tool wear, tool post deflection, part deflection, and machine wear. The gage should be capable of producing a digital readout capable of being used for control purposes and for computer processing, such as may be required to produce information for directing numerically controlled machine tools.

The advantage of non-contacting probes in automatic gaging, as for instance, optical and pneumatic probes, has been recognized. The non-contacting probe does not make physical contact with the workpiece or other object being gaged, and hence does not affect the object or influence the process. Conversely, the probe or sensor is not affected by the object due to heat conduction to the sensor, or by rubbing friction, and so on. In addition to usefulness in machining applications, another application for the non-contacting probe is measurements to determine diametric strain during tensile tests of high temperature alloys. Since the specimen is maintained at a high temperature during the fatigue tensile test, any contacting sensor for strain measurement would tend to affect the test results. Although light beam non-contacting probes have been employed in automatic gages for these applications and others, improvements are needed as previously discussed by way of improving accuracy and incorporating a combination of features to enhance the practical utility of such gages.

SUMMARY OF THE INVENTION

The principal embodiment of the invention is an automatic optical caliper for making diametric or thickness measurements and comprises a pair of independently operating optical gage units for automatically seeking the opposite edges of the object being gaged. Each gage unit includes an optical system for projecting a focused gaging light beam toward the object and adjusting means for moving the gaging beam linearly relative to one edge of the object. A photodetector senses the light beam transmitted past the edge of the object and generates an output signal indicative of its position. A servo feedback control system controlled by the detector output signal actuates the adjusting means and positions the gaging beam to be partially interrupted, preferably 50 percent interrupted by the object edge. Readout means measures the distance between the two gaging light beams, one associated with each gage unit, when so positioned as to detect opposite edges of the object, and indicates the measured distance or a measurement dependent thereon. Preferably a parallel reference light beam and reference photodetector are used to facilitate generation of the servo error signal, and all the beams are derived from a common source beam. The beam projection optics and photodetectors are mounted on movable gage carriages, and mirrors are used to reflect the beams back to the photodetectors. An electronic or optical readout technique is provided.

Modifications of the invention are that the photodetectors are mounted at the opposite side of the object on an overhanging arm assembly; that the gaging beam is adjusted by a pivoted beam deflector; and that back-scattered light reflected back from the object is detected, rather than transmitted light. A typical application is gaging the diameter of a machined workpiece, or profile gaging the workpiece.

An automatic optical gage in another embodiment comprises a single optical gage unit whose gaging light beam is positioned at a reference position or edge and subsequently positioned at another edge of the object, the distance between the two positions of the gaging beam being the desired measurement. Applications are to gage tool wear and to determine diametric strain during tensile tests of a high temperature alloy.

BRIEF DESCRIPTION OF THE DRAWINGS

FIG. 6 is a schematic circuit diagram showing the connection of the photodetectors with a differential amplifier to obtain the servo error voltage;

FIG. 7 is the error voltage characteristic produced at the output of the FIG. 6 circuit;

FIG. 8 is a block diagram of the servo feedback control system for driving the precision slides of FIG. 4 and for actuating a readout counter;

FIG. 10 is a simplified diagram of an interferometer-type optical readout system combined with the optical components for producing the two parallel gaging light beams;

FIG. 11 is a side view of a modification of the invention wherein the photodetectors are mounted at the end of a caliper arm housing that extends over the workpiece;

FIG. 12 is a schematic diagram of another modification employing a beam deflector that is adjusted by a servo mechanism to position the caliper gaging light beam relative to the edge of the workpiece;

FIG. 13 is an enlarged view of the beam deflector and focusing lens shown in FIG. 12 illustrating the adjustment of the caliper light beam;

FIG. 14 is a schematic diagram of a third modification of the invention using the principle of detecting backscattered light to determine the position of the caliper gaging light beam;

DESCRIPTION OF THE PREFERRED EMBODIMENTS

Figure 1:
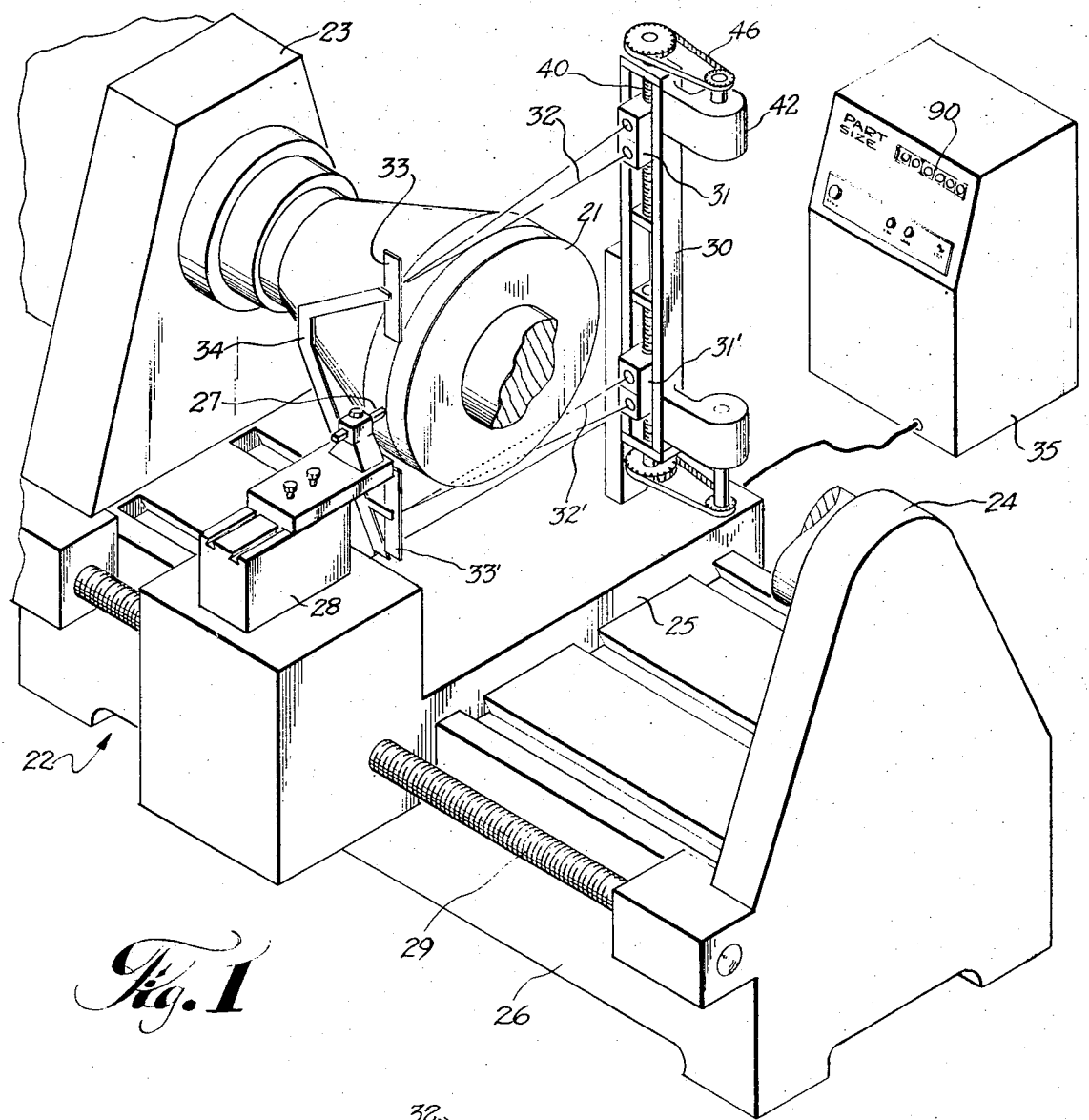
FIG. 1 is a simplified perspective view of a lathe fitted with an automatic optical caliper for on-machine gaging of a workpiece, and of an auxiliary console containing the electronic controls and readout counter.

The preferred form of the automatic optical gaging system constructed in accordance with the invention is an optical caliper for automatically gaging a diametric or thickness dimension of an appropriately shaped object, usually though not necessarily an opaque object. The automatic optical caliper is especially suitable for on-machine gaging or inspection of the diameter of a workpiece being machined on a machine tool, and is illustrated in FIG. 1 in connection with a shaft-like workpiece 21 being turned on lathe 22. As is well known, workpiece 21 is rotated about centers located in the headstock 23 and the tailstock 24 which determine the axis of the finished piece. The tool carriage 25 is movable longitudinally guided by ways on the machine bed 26, and the cutting insert for machining the workpiece is located at the end of a tool holder 27 supported on a tool post 28, mounted adjustably on the saddle of tool carriage 25. The entire tool carriage can, if desired, have longitudinal power movement by means of a feed rod 29 engaging the apron of the tool carriage.

The gaging components of the optical caliper are preferably mounted on tool carriage 25 on either side of the workpiece and move bodily with the tool carriage. To the rear of the workpiece, approximately behind the tool holder 27, are a pair of precision slide assemblies comprising an elongated upright frame 30 on which are supported a pair of vertically movable gage carriages 31 and 31'. The two gage carriages 31 and 31' respectively contain optical components for projecting two parallel light beams 32 and 32' defining a pair of caliper arms. The upper caliper gaging light beam 32 is reflected by a mirror 33 and detected by a suitable photodetector located on gage carriage 31, while the lower caliper gaging light beam 32' in similar fashion is reflected by mirror 33' and detected on a photodetector located on gage carriage 31'. Mirrors 33 and 33' are mounted in front of the workpiece on a removable bracket 34. Support frame 30 can be pivotally mounted on the tool carriage, if desired, to allow further access for loading or unloading the workpiece from the machine tool. A pair of independent servo feedback control systems to be described later uses the sensed reflected light from each caliper light beam to operate a servomechanism to adjust the two gage carriages 31 and 31' independently until each caliper light beam detects one of the diametrically opposite edges of workpiece 21. The distance between light beams 32 and 32' is then determined and is equal to the diameter of the workpiece. The electrical controls for the optical caliper and a counter for reading out the measured diameter are located in an auxiliary console 35. Basically, it is seen that the optical caliper is an optical equivalent of an automatic caliper used to measure the diameter of shafts and other surfaces of revolution.

Figure 2:
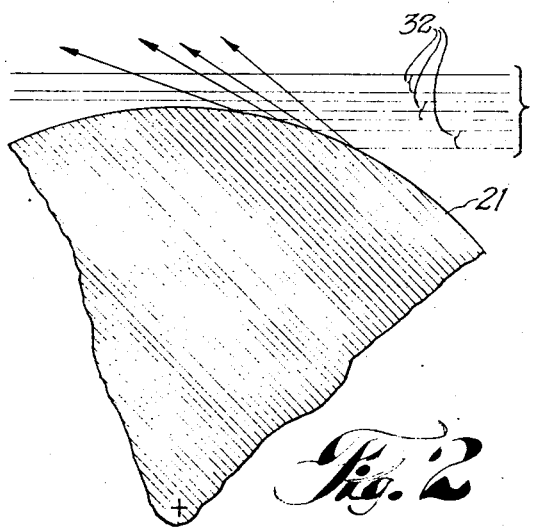
FIG. 2 is a diagram useful in explaining the adjustment of a caliper gaging light beam relative to the periphery of the workpiece.
Figure 3:
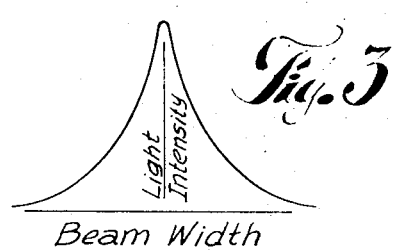
FIG. 3 illustrates the gaussian distribution of light intensity across a gaging light beam.

The adjustment of a caliper light beam relative to the peripheral edge of workpiece 21 is illustrated in greater detail in FIG. 2. Gage carriages 31 and 31' are driven to position each caliper light beam such that a predetermined portion of the light beam is interrupted or blocked by the edge of the workpiece. When light beam 32 is above the edge of the workpiece, all of it is transmitted and detected by the photodetector on gage carriage 31, whereas none is detected when the light beam is below the edge of the workpiece and is totally blocked. The magnitude of the photodetector signal is thus a measure of the position of the light beam relative to the edge of the workpiece and can be used to adjust its respective gage carriage. Preferably, the servo null point is set such that approximately 50 percent of the caliper light beam is interrupted by the workpiece. In this form of the invention and in all the other embodiments with the exception of FIG. 14, it is the transmitted light that is detected and used to operate the servo feedback control system. The reason for choosing a 50 percent interruption of the light beam as the servo operating point is apparent in FIG. 3, which illustrates the gaussian distribution of light intensity transverse to the direction of propagation of the beam, i.e., along the beam width. There is a large change in the photodetector output signal as somewhat more or somewhat less than 50 percent of the light intensity is detected, and this facilitates an accurate positioning of the light beam and hence an accurate measurement of diameter.

Figure 4:
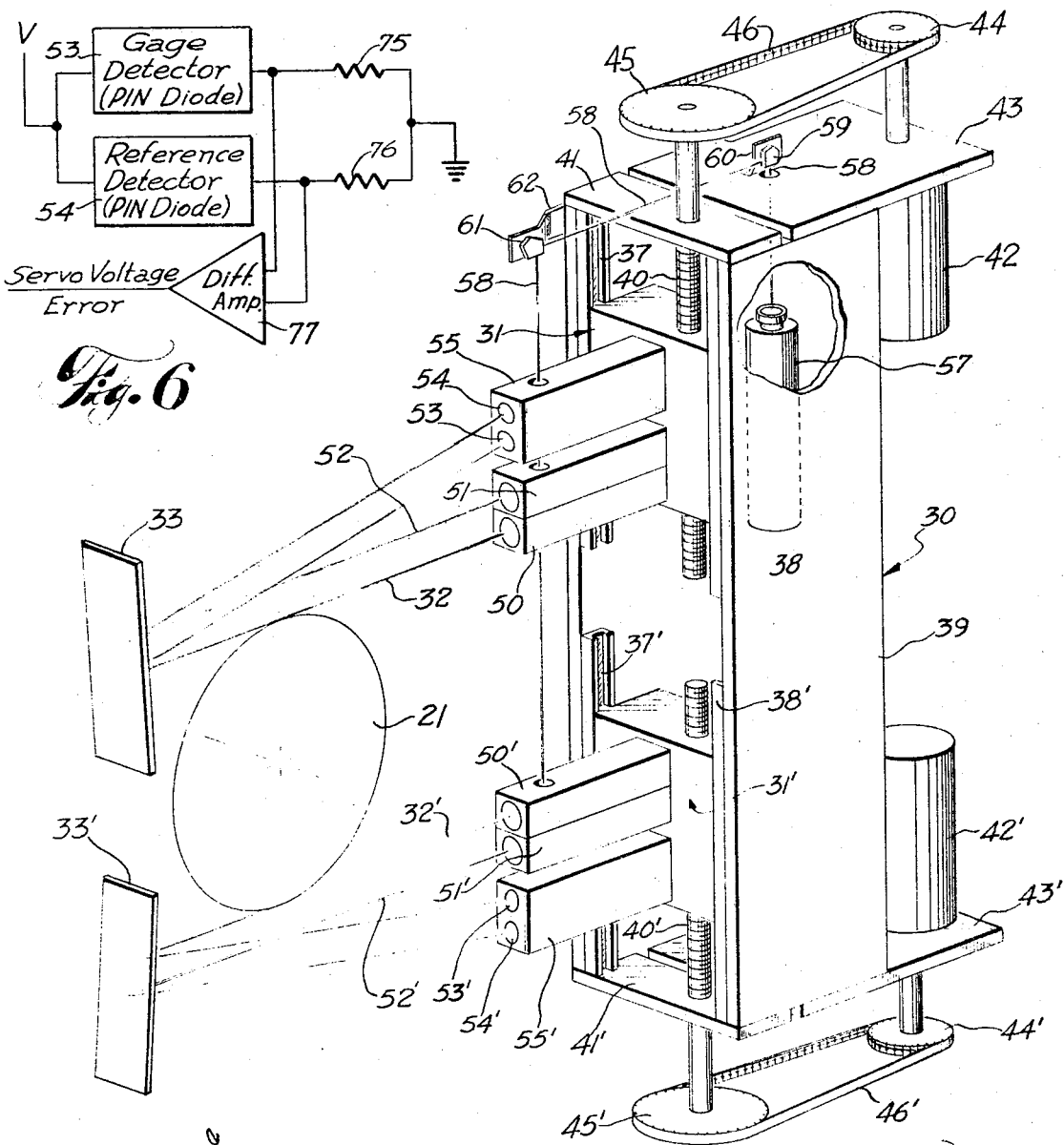
FIG. 4 is a simplified perspective view of the precision slide assemblies for independent adjustment of the two gaging light beams to positions intersecting diametrically opposite surfaces of the workpiece, and of the mirrors for reflecting each light beam back to photodetectors on the slide assemblies.

FIG. 4 shows in greater detail the precision slide assemblies mounted on tool carriage 25 behind the workpiece. Gage carriages 31 and 31' are each adjusted by a precision lead screw driven by a servo motor, although within the scope of the invention the servo drive can take other forms such as a precision rack and pinion operated by a servo motor or a hydraulic servo. Since the lead screw driving mechanisms associated with the two gage carriages are identical, only one will be described, and corresponding parts in the other mechanism are designated by corresponding primed numerals. Gage carriage 31 is essentially a slide plate which moves along a pair of parallel guideways 37 and 38 secured to the front plate 39 of support frame 30.

A precision lead screw 40 is journalled at one end in a cross bar 41 secured to front plate 39 at the upper end of guideways 37 and 38, and extends into a conventional spring-loaded half-nut assembly, not here shown, secured to the underside of carriage 31. The lead screw 40 is rotated by a servo motor 42 supported on a support frame end plate 43. To transmit the motion of servo motor 42 to lead screw 40, a belt drive including the respective gears 44 and 45 coupled by a matching notched belt 46 is employed. The rotation of servo motor 42, clockwise or counterclockwise, is transmitted by belt 46 to precision lead screw 40, which slides gage carriage 31 up or down on parallel guideways 37 and 38, depending upon the direction of rotation of the servo motor. In similar fashion, the position of lower gage carriage 31' is adjusted vertically by precision lead screw 40' depending upon the direction of rotation of servo motor 42'. The upper and lower precision slide assemblies, it is emphasized, act independently of one another.

Mounted side by side on upper gage carriage 31, to project forwardly approximately horizontal to the floor, are a gaging beam projection housing 50 and a reference beam projection housing 51. These housings respectively contain the necessary optics for projecting the previously mentioned upper caliper gaging light beam 32 and also an upper reference light beam 52. Both beams are reflected by mirror 33 and are respectively detected by a gage photodetector 53 and a reference photodetector 54 contained within a detector housing 55, which is likewise secured to the face of gage carriage 31 to project forwardly. Reference light beam 52, like gaging light beam 32, is a well defined pencil beam of light located outwardly a short distance from the gaging light beam. In similar fashion, elements 50'-55' are associated with the lower gage carriage 31', including provision for projecting the lower reference light beam 52' parallel to lower gaging light beam 32' and detecting both beams. The purpose of reference light beams 52 and 52' is to facilitate the evaluation of the output signals from the respective gage photodetectors 53 and 53', by comparing them independently with the output signals from reference photodetectors 54 and 54', usually in a differential amplifier circuit. The advantage of projecting the reference light beams all the way across to the mirrors 33 and 33', rather than detecting them close to the gage carriages, is that the gaging light beams and reference light beams are attenuated by proportional amounts should the air in the vicinity of workpiece 21 not be clear, such as due to smoke or to interference with the light beams by cutting fluids, metal chips, etc.

Although it is possible to have independent light sources on the gage carriages for deriving the gaging and reference light beams projected from each carriage, it is preferable to have a single light source from which all four beams are derived. The projection of parallel light beams, and in particular parallel gaging light beams 32 and 32', is more easily implemented in this manner. To this end, a laser 57 is mounted on support frame 30 behind front plate 39, and supplies a well-defined source beam to the projection optical components on both gage carriages 31 and 31'. Although the monochromatic nature and coherency of a laser light source are not used in this embodiment of the invention, a laser light source is desirable because it produces a well-collimated high intensity, pencil beam of light. Laser 57 is suitably a helium-neon gas laser producing light with the wavelength of 6328 A. The well-defined source light beam 58 from laser 57 is projected upwardly, deviated through 90° by pentaprism 59 mounted on a cantilever bracket 60, and again deviated through 90° by a second pentaprism 61 mounted on another cantilever bracket 62. Source light beam 58 is projected downwardly through a tunnel in detector housing 55 to the optical components in reference and gaging beam projector housings 51 and 50. A portion of the original source light beam continues downwardly to be the source beam for the lower projector housings 50' and 51'.

Figure 5:
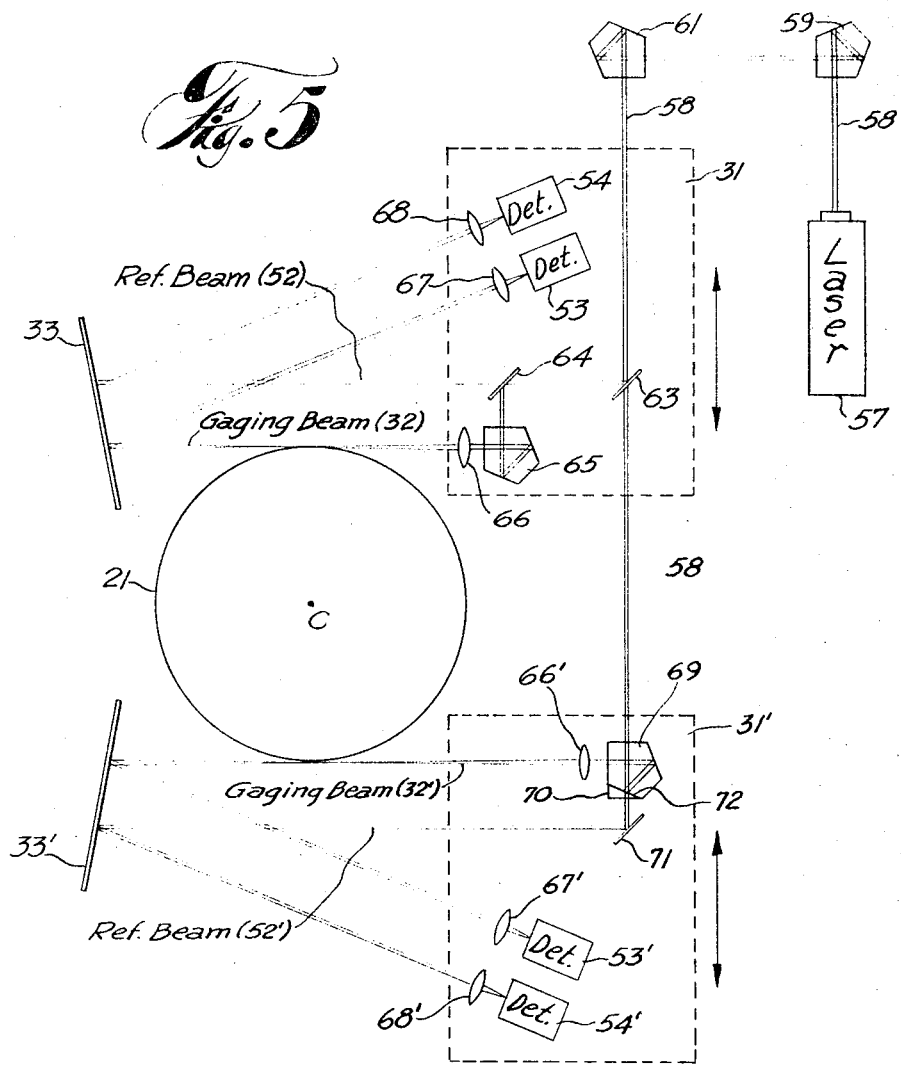
FIG. 5 is a schematic diagram of the optical system associated with the mechanism shown in FIG. 4.

Further details of the optical system associated with the gaging mechanism of FIG. 4 are illustrated in diagrammatic form in FIG. 5. Each of the pentaprisms 59 and 61 have the characteristic that the emerging rays are always deviated by exactly 90° with respect to the incident rays. Two opposing sides of the pentaprism are silvered to obtain total internal reflection of the light beam. The use of pentaprism, rather than mirrors, achieves improved alignment stability because the pentaprism can be rotated through small angles without changing either the direction or displacement of the emerging beam. Thus the mechanical stability requirement is only that the two pentaprisms be moved along a path parallel to the laser source beam and slight rotations of the pentaprisms are allowed. Source beam 58, after being bent through 180°, is projected downwardly onto beam splitter 63, and a portion of the beam is reflected forwardly onto another beam splitter 64, where the beam is split a second time. The portion of the light beam transmitted by beam splitter 64 is the reference light beam 52 whereas the portion of the light beam reflected by beam splitter 64 is deviated through 90° by a pentaprism 65 and then passed through a focusing lens 66. Beam splitters 63 and 64 must be kept parallel and are preferably formed on a single piece of glass where the half-silvered surfaces are ground parallel to one another so that the emerging beams from surface 64 to pentaprism 65 will be aligned parallel with the source beam 58. This light beam emerging from focusing lens 66 is the gaging light beam 32, and the focal length of lens 66 is such that the focused spot at the focal point is approximately above the center C of workpiece 21. This improves the accuracy and sensitivity of the optical caliper, and typically the focused spot has a diameter of about 5 mils. Since the focal length of focusing lens 66 is long, inaccuracies of the alignment of the focused spot with the workpiece center C do not materially affect the accuracy of the optical caliper. The gaging beam 32 reflected from mirror 33 is focused onto the light sensitive surface of gage photodetector 53 by a lens 67. In similar fashion, the reflected reference light beam 52 is focused onto the light sensitive surface of the reference photodetector 54 by a lens 68.

The portion of common source beam 58 transmitted by beam splitter 63 is projected downwardly to the optical components associated with lower gage carriage 31'. A combination pentaprism 69 and beam splitter 70 is provided to partially reflect a portion of the source beam to form gaging beam 32' and to partially transmit a portion of the source beam to form, after reflection by mirror 71, the reference beam 52'. For this purpose, one side 72 of pentaprism 69 is partially silvered, and beam splitter 70 compensates for the refraction at the interface so that the emerging source beam is aligned with the source beam incident on the combination of pentaprism 69 and wedge 70. The lower caliper gaging beam 32' is, of course, focused to a spot by focusing lens 66', and the focused spots of upper and lower gaging beams 32 and 32' are vertically aligned since the projection optics are symmetrical. It is readily observed by comparison with FIG. 4 that mirror 71 is contained within the lower reference beam projection housing 51', and that pentaprism 69, beam splitter 70, and lens 66' are contained in lower gaging beam projection housing 50', and similarly for the upper projection components. The particular advantage of the optical arrangement shown in FIG. 5 is that by use of a common source beam 58 for both the upper and lower gage carriage projections optics, in combination with the use of pentaprisms and beam splitters to simplify mechanical alignment problems, the two caliper gaging beams 32 and 32' are exactly parallel to one another, thereby almost eliminating any source of error due to non-parallelism of the gaging light beams.

A practical consideration that must be taken into account in any optical gaging instrument is keeping the optical parts clean during the measurements. In machine tool applications there are problems of sprayed coolants, flying chips and turnings, etc., which can be a hazardous environment of an optical system. The lenses and photodetectors must be considered exposed to the environment, and hence should be protected. Ways of protecting the lenses are the same as those for protecting the photodetectors. One possible mount (not illustrated) is to mount the part behind a tubular forepiece with two aligned light beam apertures, whereby oil and other particles would have to have an unlikely trajectory to get through both apertures to strike a lens or detector. Particles admitted through the first aperture but not the second would be trapped in the forepiece and drain through an exit opening in the bottom wall. To prevent further contamination of this type, the mount can be pressurized so that there is a slight airflow out of the apertures to prevent entry of any particles.

FIGS. 6 and 8 show schematically the servo feedback control systems for causing gaging light beams 32 and 32' to independently seek the diametrically opposite edges of workpiece 21 and come to rest for a gaging measurement when each is partially interrupted. Gage photodetector 53 and reference photodetector 54 illustrated diagrammatically in FIG. 6 are preferably identical, light-activated semiconductor devices such as silicon PIN photodiodes, but can also be phototransistors, other types of photodiodes, photoresistors, silicon solar cells, or other appropriate electro-optical devices such as photocells. When biased with a source voltage, silicon PIN photodiodes have the characteristic that the current through the diode is proportional to the intensity of the light impinging upon the device, assuming that the incident light has a wavelength within the spectral range to which the device is responsive. Photodetectors 53 and 54 are respectively connected in series with load resistors 75 and 76, to convert the current signals to output voltage signals, and arranged in parallel circuit branches between a source of voltage V and ground. A differential amplifier 77 is used to convert these output voltage signals, which are proportional to the light impinging on the gage and reference photodetectors, to a servo error voltage. Accordingly, the two inputs for differential amplifier 77 are the voltages developed across resistors 75 and 76. The output error voltage characteristic of the differential amplifier is given in FIG. 7. This characteristic is linear with light intensity and desirably has an appreciable slope with respect to the abscissa. The servo null point, when the error voltage is zero, occurs when the gage input voltage is half the reference input voltage, indicating that the gaging light beam is 50 percent blocked. To prevent the servo system from hunting, the servo null occurs when the error voltage is approximately zero as determined by the threshold limits of box 78 surrounding the precise zero point. The convention chosen is that the error voltage is positive when the gaging light beam if fully transmitted or less than 50 percent blocked, and is negative for the situation that the gaging light beam is totally blocked or more than 50 percent blocked.

The remainder of the servo feedback control system is shown in block diagram form in FIG. 8. Servo motor 42 is more particularly a precision stepping motor, and the resolution of each caliper light beam arm is dependent, among other things, on the screw thread pitch of precision lead screw 40 and the angular step movement made for each pulse applied to stepping motor 42. In an optical caliper with a resolution of ±0.0001 inch and an accuracy of ±0.0003 inch, which is typical of the precision gaging possible with an optical caliper constructed as herein taught, a precision stepping motor is used requiring 200 pulses per revolution and the lead screw pitch is chosen such that one pulse results in 0.0001 inch movement of gage carriage 31 and caliper gaging light beam 32. Stepping motor 42 is energized by a motor controller including an indexer 80, a pulse generator 81, and a motor drive 82 connected serially as shown. A suitable stepping motor and motor controller which can be used are identified as the SLO-SYN stepping motor and SLO-SYN high speed preset indexer, manufactured by Superior Electric Company, Bristol, Connecticut. Briefly, pulse generator 81 generates pulses for driving the stepping motor under the control of indexer 80, and these pulses are amplified by motor drive circuit 82. The circuit for generating the servo error voltage (FIG. 6) is identified here by the numeral 83. The servo error voltage is amplified by a suitable amplifier circuit 84 and then fed through a reversing switch 85, whose purpose will be explained later, to a logic circuit 86. Logic 86 has several functions. One function is to serve as a threshold circuit for identifying when the servo error voltage is near the null point, within the limits defined by box 78 (FIG. 7), in which case stepping motor 42 is stopped completely to prevent hunting. When there is a positive servo error voltage, logic 86 calls for positive direction movement of stepping motor 42 to move the caliper gaging light beam 32 closer to the workpiece, and the logic calls for negative direction movement when there is a negative servo error voltage. In addition to an input from logic circuit 86, indexer 80 also has manual, automatic, or computer control inputs. The manual control allows the operator to introduce a known motion, e.g., 0.1 inch, and this over-rides the usual automatic controls. There is also a computer over-ride to move the caliper gaging light beam 32 to a predetermined position. The output of amplifier 84 is also fed to a speed control 87, which changes the rate at which pulses are produced by pulse generator 81. This is to permit stepping motor 42 to move faster when there is a large servo error voltage, and more slowly when near the servo null point.

A readout circuit for determining and displaying the distance between caliper gaging light beams 32 and 32', that is, the diameter of workpiece 21, is also illustrated in FIG. 8. This is an electronic readout based on making a running algebraic count of the pulses supplied to stepping motors 42 and 42'. A servo feedback control system identical to that just described, designated by numerals 80'–87' is associated with the lower gage carriage 31' and other mechanisms for causing the lower caliper gaging light beam 32' to detect the diametrically opposite edge of workpiece 21. In the readout circuitry, logic circuit 88 has inputs from both sides of the optical caliper and to this end is respectively connected to the output terminals of pulse generators 81 and 81'. The basic function of logic 88 is to prevent loss of counts should pulses from the two sides of the optical caliper arrive simultaneously at the counter. A sample and hold circuit within logic 88 continuously scans the pulse generator outputs at short intervals to detect all the pulses supplied to motor drive circuits 82 and 82' regardless as to the speed at which stepping motors 42 and 42' are operating. The pulses are stored in a hold circuit, and then algebraically summed in up-down counter 89, from which the diameter of workpiece 21 in inches is derived based on the distance each pulse moves gage carriages 31 and 31', and consequently caliper gaging light beams 32 and 32'. For the example given previously, each pulse produces 0.0001 inch movement of the caliper gaging light beams. The data output of counter 89 is observed visually by a dial counter 90 on auxiliary console 35, FIG. 1. The data output of counter 89 can also be supplied to a tape punch 91 or other suitable machine for making a computer processable tape giving the machine dimensions of workpiece 21. This accessory has greater utility during profile gaging. Instead of showing the diameter directly, the reading on counter 89 can be some other measurement related to or indicative of the diameter such as deviation from a desired dimension.

Figure 9:
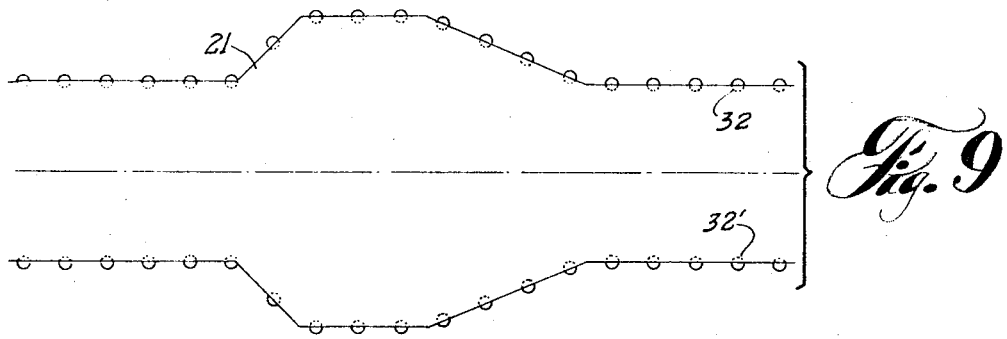
FIG. 9 is a side view of a portion of the workpiece shown in FIG. 1 illustrating successive positions of the pairs of light beams obtained while gaging the profile of the workpiece.

Referring to FIGS. 1 and 9, profile gaging involves moving the entire optical caliper longitudinally of workpiece 21 to gage the diameter of the workpiece at a succession of axially spaced points. Workpiece 21, it is observed, has cylindrical sections with different diameters, as well as at least one tapered section connecting together the different diameter sections. As was mentioned, the main gaging components are mounted on tool carriage 25 for movement with the tool carriage. By moving the tool carriage and optical caliper as successive gaging measurements are made, as illustrated diagrammatically in FIG. 9, the profile of workpiece 21 is obtained. By using tape punch 91 (FIG. 8) to record the measured profile of the workpiece, this information can be used in numerically controlled machining to make a comparison with the desired measurements, and to make still another tape for directing the machine tool during finish machining operations. Continuous relative movement between the optical caliper and the workpiece causes he caliper gaging light beams 32 and 32' to automatically seek and follow the profile of the workpiece. In some gage setups, where it is possible to control the rate of axial movement of the optical caliper, it is desirable to make the velocity of movement in the axial direction inversely proportional to the magnitude of the servo error voltage. When the error voltage is low, meaning that the light spot is properly positioned with respect to the edge of the part, forward velocity in the axial direction is at a maximum. When the error signal is large, either positive or negative, the forward axial velocity is decreased and is actually stopped for sufficiently large error signals.

The operation of the preferred embodiments of the optical caliper illustrated in FIGS. 1–8 will be reviewed briefly before proceeding to a discussion of the modifications of the invention. The optical caliper make accurate on-machine, and possibly in-process, measurements of the diameter of workpiece 21 being machined on lathe 22 without requiring knowledge of the position of the center of the workpiece. The basic gaging method is that the two well-defined caliper light beams 32 and 32', which are focused to spots with diameters of about 5 mils or less, are adjusted independently by optical and servo techniques until each spot is approximately 50 percent interrupted by the opposite peripheral edges of the workpiece. Upon initially turning on the optical caliper, it is necessary to reference the gage and readout counter 90 to give a correct indication of the diameter of the workpiece being gaged. The preferred way is to allow caliper gaging light beams 32 and 32' to detect the edges of a machine gage with a known diameter. The known dimension of the part is then introduced into counter 90. This procedure is necessary each time the automatic gage is turned off. If extreme accuracy is desired it may be necessary, before gaging the diameter of a machined workpiece, to blow or wipe off or use a doctor blade to remove any cutting oils remaining on the surface of the workpiece. The maximum and minimum workpiece diameters that can be accommodated are determined by the limits of movement of upper and lower gage carriages 31 and 31'. A useful range well within the capabilities of the optical caliper is 6 inches to 18 inches.

Laser light source 57 (FIG. 4) supplies a common, high intensity, pencil source beam of light 58 which is deviated through 180° by pentaprisms 59 and 61, and is successively partially reflected to obtain the four parallel light beams including upper reference beam 52 and gaging beam 32, and lower gaging beam 32' and reference beam 52'. To determine the position of a gaging light beam with respect to the edge of the workpiece, using upper gaging beam 32 as an example, the output signals of gage photodetector 53 and reference photodetector 54, which detects the light beams after reflection by mirror 33, are compared in a differential amplifier circuit 77 (FIG. 6). The servo error voltage produced by differential amplifier 77 is approximately zero when exactly 50 percent of the gaging light beam is blocked, and has a positive polarity when more than 50 percent is blocked and a negative polarity when less than 50 percent is blocked. The magnitude of the servo error voltage, as is shown in FIG. 7, furthermore is proportional to the amount of intensity error.

The analog error voltage is amplified by amplifier 84 (FIG. 8) and fed through logic 86 and indexer 80, which is set for automatic mode operation. Indexer 80 directs pulse generator 81 to supply pulses through motor drive 82 to rotate servo stepping motor 42 forward or in the reverse direction, depending upon the polarity of the error voltage. Precision stepping motor 42 (see also FIG. 4) acts through a belt drive 46 to turn precision lead screw 40 in the proper direction, thereby adjusting upper gage carriage 31 linearly along guideways 37 and 38 and simultaneously moving upper caliper gaging light beam 32 with respect to the edge of workpiece 21. The servo control system operates in conventional closed feedback loop fashion until gaging light beam 32 is 50 percent interrupted by the edge of workpiece 21 and the servo null point is reached. At the same time, on a completely independent basis, lower gage carriage 31' is actuated by its servo feedback control system to position lower caliper gaging beam 32' such that 50 percent of the light beam is interrupted by the diametrically opposite edge of workpiece 21. A feature of this servo feedback control system (FIG. 8) is that speed control 87 changes the rate of production of pulses for stepping motor 42 to cause a more rapid movement of the respective gaging light beam when there is a large error voltage. The electronic readout circuit including logic 88 and counter 89 samples the outputs of pulse generators 81 and 81', makes a running algebraic count of the pulses, and displays the measured diameter of workpiece 21 to the operator visually by means of counter 90 on auxiliary console 35 (FIG. 1). For a focused spot diameter of 5 mils for each gaging light beam, and an electromechanical precision slide mechanism adjusted 0.0001 inch for each pulse applied to the stepping motor, the measured diameter is displayed to 1 ten-thousandths of an inch.

The optical caliper constructed in accordance with the invention has several advantages. The gage does not contact the workpiece and therefore does not influence the process. Nor is the optical sensor affected by the workpiece through heat conduction to the sensor or by rubbing friction, etc. Gaging can be performed on-machine either with the workpiece rotating or stopped. The automatic gaging is performed quickly and minimizes the down-time of the machine tool, and automatic readout of the part dimension or deviation makes the information immediately available to the machine operator without change of error. The use of a common source beam for both caliper gaging light beams assures that they are exactly parallel to one another. The location of each photodetector 53, 54, etc., is not critical since tolerance to its position is at least one order of magnitude greater than the positioning of the beam with respect to the edge of the workpiece for two reasons. First, the tolerance varies approximately as the diameter of the beam at any point, and since it is a great deal larger at the photodetector than it is at the edge of the workpiece, the location of the detector is less critical. Second, because the effective size of each photodetector is considerably larger than the beam diameter at that point the tolerance to relative motion is quite large. Therefore, precise location of the mirrors 33 and 33' with respect to the photodetectors is also not necessary. Also, the focusing lenses 66, etc., have a rather long focal length so their position can be near the other optical components so as to make this portion of the assembly as small as possible. The exact location of the focal point of the focusing lens with respect to the edge of the workpiece is also not critical. If the edge is near the unfocused portion of the beam where its diameter is slightly larger than the focal point, this has the effect of reducing the sensitivity of the system, but the sensitivity is not reduced greatly due to the long focal length used and the resulting small angle of divergence of the beam. In view of this explanation, it is seen that the optical caliper is capable of making accurate measurements of diameter, with an accuracy in the range of ½ mil or less. Another feature of the automatic optical caliper is that it is suitable for operation with computer processable tapes, and is compatible with numerically controlled machining techniques.

The invention is applicable to the gaging of diameters of parts on machine tools other than the horizontal lathe, such as vertical lathes, boring machines, broaching machines, grinders, and for some operations on milling machines, planers, and shapers. The gage has utility for measuring thickness dimensions on appropriately shaped parts or objects, not round or spherical, as for instance an object with one or more convex surfaces. In the event that the part is not round, either intentionally or by improper machining, the out-of-roundness can be detected by observing and measuring the motion of one or both of the caliper arms. For the case of an odd number of lobes, assuming that the part is rotating during gaging, the diametric measurement is constant but both arms are in motion. For an even number of lobes, both arms are also in motion but the measured diameter varies between a minimum and a maximum. Either type of out-of-roundness is detected by monitoring the motion of one caliper arm. Finally, the application of the optical caliper to automatic profile gaging has been discussed.

Among the modifications of the invention, another form of automatic readout suitable for use with the optical caliper is illustrated in FIG. 10. This is an optical readout based on the principles of interferometry using the coherency of the laser source, and has the advantage, as compared to the electronic readout as described, of making a direct measurement of the distance between the caliper light beam arms 32 and 32'. This figure also shows a modification of a portion of the optical system of FIG. 5 in that the pentaprisms 65 and 69 for diverting a portion of common source beam 58 to form the gaging light beams are replaced by a beam splitter and a mirror. Beam splitter 94 is mounted on upper gage carriage 31 and reflects part of common source beam 58 to form upper gaging beam 32, while the transmitted part is totally reflected by mirror 95 and forms lower caliper gaging beam 32'. Assuming proper alignment of components 94 and 95, the two gaging beams are projected parallel to one another. To implement the interferometer a portion of each gaging beam is diverted by the respective beam splitters 96 and 96', and these interferometer beams are reflected back along the same path by the respective mirrors 97 and 97'. The upper interferometer beam reflected by beam splitter 96 is projected back along the path of upper gaging beam 32 and is transmitted through beam splitter 94 to a suitable optical interference detector 98. The lower interferometer beam reflected by beam splitter 96' is reflected back along the path of lower gaging beam 32', is then reflected by mirror 95 back along the path of source beam 58, and is deviated by beam splitter 94 to recombine the two interferometer beams to cause interference. A complete cycle of constructive and destructive interference is produced in each half wavelength of relative motion between the combined upper and lower interferometer beams. Since the distances between the mirrors of the upper caliper arm and between the mirrors of the lower caliper arms are fixed, the only remaining variable distance is that between the two caliper arms. Therefore, the interferometer measures the distance between the two caliper gaging beams 32 and 32' and, hence, the diameter of the part being gaged which is indicated by counter 99. As in any interferometer, the reference dimension has to be established and this can be done by calibrating to a standard part of known diameter. The interferometer readout technique, of course, is more accurate than the positioning of the gaging beams to detect the edges of the workpiece, and introduces no error as to this portion of the system. A unique feature of the optical arrangement, which can also be implemented using pentaprisms, is that it uses a single laser light source to generate the two caliper gaging beams as well as the two interferometer beams.

Another suitable form of automatic optical readout, not here illustrated, is a linear encoder. Basically, optical linear encoders employ two superimposed glass scales, each with a series of constant-spaced optical rulings. By moving the two scales relative to one another, the rulings are alternately in and out of alignment and thus alternately transmit and block light. The light pulses are counted to measure the linear movement. Linear encoders are available that are capable of readout to 0.0001 inch.

In the modification of FIG. 11, the photodetectors are mounted at the end of an arm overhanging the workpiece, thereby eliminating the use of mirrors 33 and 33'. In this figure only the upper caliper arm housing is illustrated. The reference and gaging beam projection optics mounted on upper gage carriage 31 includes a beam splitter 100 for deriving reference beam 52, and a mirror 101 and the focusing lens 66 for deriving gaging beam 32 and focusing it to a spot at the point the beam initially intersects the edge of workpiece 21. A caliper arm housing 102 is secured in cantilever fashion to gage carriage 31 and overhangs the workpiece above reference and gaging beams 52 and 32. The free end of arm 102 is formed with a downwardly projecting photodetector mount for reference photodetector 54 and gage photodetector 53. It is not necessary that caliper arm housing 102 be extremely rigid or massive, as the location of each photodetector is not critical since the tolerance to its position is at least one order of magnitude greater than the positioning of the beam with respect to the edge of the workpiece. The tolerance varies approximately as the diameter of the beam at any point and since it is a great deal larger at the detector than it is at the edge of the workpiece the location of the detector is less critical. In view of the fixed connection between caliper arm 102 and gage carriage 31, the beam projection optics and the photodetectors move as a unit as gaging beam 32 seeks and follows the edge of workpiece 21.

The photodetector mounting arrangement at the end of an overhanging caliper arm housing is especially suitable for a split-type of photodetector not requiring the use of a separate reference beam 52. The split photodetector, not illustrated, typically has a circular light sensitive area split into two independent semicircular detectors. When the gaging beam is out contact with the workpiece, most of the light falls on the upper detector, and the beam is adjusted until the light is split evenly between the upper and lower detectors. If the gage overshoots, more of the light falls on the lower detector and an opposite polarity servo error voltage is generated to cause the beam to be adjusted back to the point at which half of the light is interrupted by the edge of the workpiece.

The embodiment of the invention shown in FIG. 12 uses a glass beam deflector to adjust the gaging beam relative to the edge of the workpiece, and is more suitable for scanning rapidly over a narrow range of workpiece diameter variations. Further, a different technique for deriving the reference beam is employed, and a light chopper is used on the source beam to produce an a-c component of signal light to allow discrimination against ambient light variations. Light chopper 105 is, for example, a slotted rotating disk. The chopped source light beam 58 is projected to a beam splitter 106 to derive the orthogonally related gaging beam 32 and reference beam 52. Gaging beam 32 passes through a focusing lens 66 and a beam deflector 107 before being focused to a spot, and gage photodetector 53 is located at the other side of the workpiece mounted at the end of a caliper arm (not here shown) similar to that of FIG. 11. Reference photodetector 54, however, is located below the projection optics at the other side of the workpiece. The servo error voltage developed by a-c differential amplifier 77 is supplied to a servo control circuit 108 which, in the manner previously explained, feeds pulses to servo motor 42. The servo motor in this case causes beam deflector 107 to pivot about pivot point 109.

As demonstrated by the enlarged view, FIG. 13, beam 32 is undeviated when beam deflector 107 is perpendicular to the direction of the incident beam, but is deflected an increasingly larger amount as the beam deflector is pivoted away from the perpendicular. Adjustment of beam deflector 107 in this manner produces a vertical displacement of the focused spot 110, and the angular position of beam deflector 107 when focused spot 110 is partially interrupted by the edge of workpiece 21 is a measure of the diameter. Servo control circuit 108 and servo motor 42 operate in the manner previously described to cause the focused gaging beam to seek and follow the edge of the workpiece. A readout is provided by a pointer 111 on beam deflector 107 moving relative to a graduated scale 112. In this system, projection optics 106 and 66, photodetectors 53 and 54, and beam deflector 107 are all fixed in space with the exception of the pivotable beam deflector. To obtain a gage with a wider range of measurement, these components can be mounted on a slide for manually or automatically rough positioning the gaging beam. Although preferably only one caliper light beam arm is used as an edge detector and follower, in the manner explained in greater detail later, two such independently operating arms can be used as optical caliper.

Figure 15:
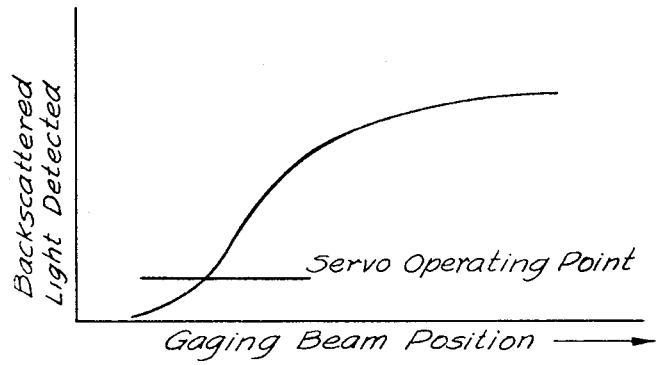
FIG. 15 shows a plot of backscattered light detected versus light beam position for the arrangement of FIG. 14.

In the form of the invention shown in FIG. 14, the basis of operation is the detection of backscattered light reflected from the edges of workpiece 21, rather than the detection of transmitted light as in the previous embodiments. As upper and lower gage carriages 31 and 31' adjust to position caliper light beam arms 32 and 32' tangential to the opposing edges of workpiece 21, a portion of each light beam is reflected back as indicated by the diverging rays. The backscattered light is collected and focused by the respective focusing lens 67 and 67' and detected by photodetectors 53 and 53'. The photodetectors are located in a fixed position with a large enough viewing angle to encompass the range of diameters to be gaged, or can be mounted on gage carriages 31 and 31' by means of brackets 113 and 113', shown in dotted lines. FIG. 15 shows the detected backscattered light characteristic with respect to the gaging beam position. As the gaging beam moves inwardly toward the center of the workpiece, the amount of detected backscattered light increases until a saturation point is reached when all the beam is reflected by the edge of the workpiece. The servo operating point is set to hold the projected beam so that only a small portion of it intersects the workpiece. The detection of less backscattered light than this causes the servo control system to move the gaging beam inwardly, whereas the detection of a larger amount of backscattered light than this moves the beam outwardly. To implement this mode of operation, differential amplifiers 77 and 77' have a reference voltage as one input. It is probably necessary to use a narrow bandpass color filter and a light chopper (see 105, FIG. 12), to discriminate against ambient light. The advantage of this arrangement is that all of the gage components are located behind the workpiece. Also the installation of the gage is simplified.

Figure 16:
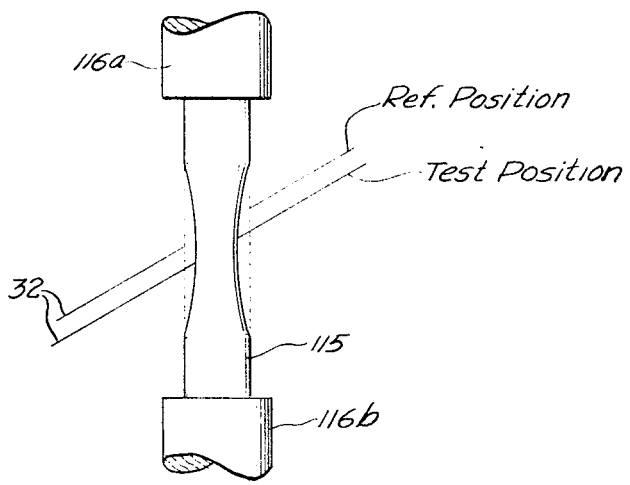
FIG. 16 is a sketch illustrating the application of a single gaging light beam as an edge detector to determine diametric strain during tensile tests of a high temperature test piece.

A single optical gage unit comprising only one gaging light beam and servo adjusting mechanism constructed in accordance with any of the previous forms of the invention can be used as an automatic edge detector and follower. One application for an automatic non-contacting edge detector is illustrated schematically in FIG. 16. An edge position measurement is used here to determine the diametric strain during tensile tests of a special high temperature alloy. Test specimen 115, engaged between the jaws 116a and 116b of a testing machine, becomes elongated and develops a diametrically necked-down portion as the test proceeds. Before the test begins, the gaging light beam 32 is adjusted to a reference position partially interrupted by the original diameter of the specimen illustrated in dotted line. At the end of the test, gaging light beam 32 is repositioned in a test position detecting an edge of the necked-down portion of the specimen. The difference between the reference and test positions is used to determine the diametric strain. Since the specimen is maintained at a relatively high temperature during the fatigue tensile test, any contacting means for strain measurement would tend to affect the results of the test. Therefore, the non-contacting optical probe is desirable.

Another method for measuring diametric strain using only one optical gage unit, i.e., a single gaging light beam, is to measure the necked-down diameter of the specimen and compare it with the original diameter. Gaging light beam 32 in the usual manner is set in a first position detecting one edge of the specimen after completion of the tensile test, and the measurement on counter 90 is noted. Reversing switch 85 (FIG. 8) is then switched to the other position before releasing the gage to detect the diametrically opposite edge of specimen 115. Changing switch 85 has the effect of reversing the convention of negative and positive servo error voltages. Whereas previously a positive error voltage causes the gaging light beam to move inwardly toward the center of the object being gaged, the reversal of the convention means that a positive error voltage now causes the gaging beam to adjust outwardly. Consequently, the operation of the optical gage after changing reversing switch 85 is to seek the opposite edge of the specimen. The difference in counter readings at the first and second positions of the gaging beam is the desired measurement. This method, of course, can be used to measure diameters of workpieces and other objects in general, and is an alternate approach to the preferred form of automatic optical caliper using two light beam arms.

Figure 17:
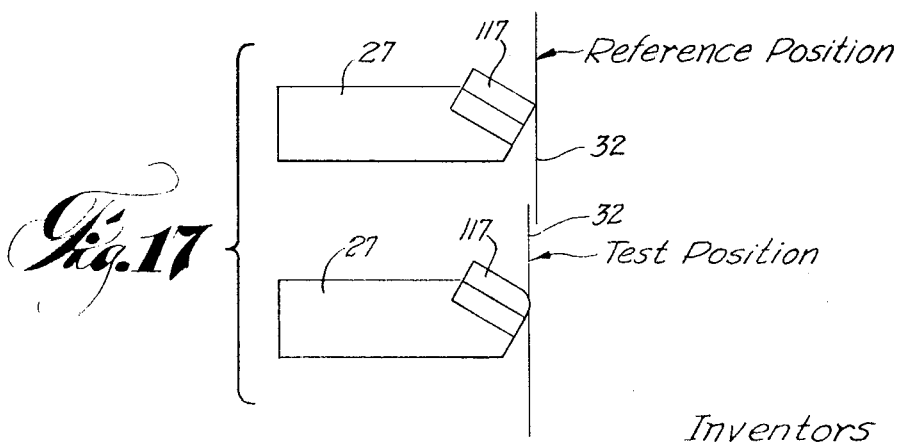
FIG. 17 shows two side views of a cutting tool insert and holder in a tool wear detector application using a single gaging light beam as an edge detector.

Another special application for tool cutting insert wear detection is illustrated in FIG. 17. The two sketches show the condition of cutting tool insert 117, which is mounted on tool holder 27, before and after a period of use. The cutting edge of the insert becomes flattened as it wears. Gaging light beam 32 is adjusted to a reference position detecting the edge of the unworn cutting insert 117, and is repositioned after a period of use to the test position detecting the worn edge of the cutting insert. The amount of wear is gaged accurately. In a similar manner, the automatic optical edge detector has utility in tool setting applications, and as a depth of cut indicator. One of the light beam optical gage units constructed as herein taught can also be used in an automatic optical caliper in combination with a different type of non-contacting probe, such as a triangulation type optical probe or a pneumatic probe.

In summary, an automatic caliper and calipering method for making linear measurements employs non-contacting light beam "arms" to make diametric or thickness measurements of appropriately shaped objects. The two caliper light beams are adjusted independently by optical and servo techniques until each is partially interrupted by opposing edges of the object. Preferably the servo operating point is set at interruption of approximately 50 percent of a focused light beam. Usually the transmitted portion of the gaging light beam is detected and utilized to generate a servo error voltage, but in one embodiment (FIG. 12) the back-scattered light is detected. Among the other desirable features incorporated in the optical caliper are the use of a reference light beam and photodetector, a common laser source beam and optics to ensure parallelism of all the beams, a precision slide assembly for accuracy of positioning the beams, and an automatic readout with graduations as fine as ten-thousandths of an inch. A typical application is on-machine gaging of workpiece diameters, or profile gaging of a part. Within a broader definition of the invention a single optical gage unit including one gaging light beam and servo adjusting mechanism is employed as an automatic edge detector and follower.

While the invention has been particularly shown and described with reference to several preferred embodiments thereof, it will be understood by those skilled in the art that the foregoing and other changes in form and details may be made therein without departing from the spirit and scope of the invention.

What we claim as new and desire to secure by Letters Patent of the United States is:

1. An automatic optical gage for making linear measurements of objects comprising
   an optical system including a laser light source for deriving and projecting narrow continuous gaging and reference light beams and for focusing said gaging light beam to a small diameter spot,
   a pivoted beam deflector for producing linear displacement of the focused gaging light beam relative to the edge of the object,
   gage and reference electro-optical photodetectors for respectively sensing said gaging and reference light beams and generating electrical output signals indicative of the intensity thereof, servo feedback control means including a difference circuit for deriving a linear servo error voltage dependent on the relative magnitudes of the two photodetector output signals, and a servomechanism for adjusting said pivoted beam deflector to a position in which said focused gaging light beam is partially interrupted by the edge of the object, and readout means for obtaining a measurement dependent on the distance between the adjusted position of said gaging light beam and a reference position.

2. An automatic optical caliper for gaging workpieces comprising the combination of a laser light source for deriving a narrow source light beam, a pair of aligned, independently operating optical gage units for automatically seeking respective opposite edges of the workpiece, each optical gage unit including a gage carriage guided for linear movement on which is mounted an optical system that receives said source light beam and projects continuous parallel gaging and reference light beams, gage and reference electro-optical photodetectors supported for movement with said gage carriage for respectively sensing the light transmitted by said gaging and reference beams past the edge of the workpiece and for generating electrical output signals indicative of the intensity thereof, servo feedback control means controlled by said photodetector output signals and including a digitally operated servomechanism for actuating said gage carriage and positioning each gaging light beam to be partially interrupted by one edge of the workpiece, and digital electronic readout means for measuring the distance between the two gaging light beams when so positioned and for indicating a measurement dependent on this measured distance.

3. A construction according to claim 2 in which said servo feedback control means, in each optical gage unit, comprises a differential amplifier for generating a servo error voltage based on the relative magnitudes of said photodetector output signals, and a pulse generator actuated by said error voltage, and in which said digitally operated servomechanism is a stepping motor energized by the pulses produced by said pulse generator for adjusting said gage carriage, said digital electronic readout means including a circuit for making a relative count of the pulses supplied respectively to the two stepping motors in the two optical gage units.

4. A construction according to claim 2 equipped for profile gaging by further including means for simultaneously moving the two gage carriages and components mounted thereon along the axis of the workpiece so that the two gaging light beams automatically seek and follow the opposing edges of the workpiece for profile gaging.

5. An automatic optical caliper for gaging workpieces comprising a laser light source for deriving a single narrow source light beam, a pair of aligned, independently operating optical gage units for automatically seeking opposite edges of the workpiece, each optical gage unit including an optical system for receiving said source light beam and deriving therefrom and projecting a continuous gaging light beam and a continuous reference light beam, adjusting means for moving at least said gaging light beam relative to one end of the workpiece, gage and reference photodetectors for respectively sensing said gaging and reference light beams and generating output signals indicative of the intensities thereof, servo feedback control means responsive to said photodetector output signals for actuating said adjusting means and positioning said gaging light beam to be interrupted by the one edge of the workpiece, and optical interferometer readout means for obtaining a measurement based on the distance between the two gaging light beams when positioned to be interrupted by the opposite edges of the workpiece, said readout means including means for deriving from said gaging light beams and subsequently combining a pair of interferometer beams whose only path length difference is the actual distance between the two gaging light beams.

6. A construction according to claim 5 wherein said optical interferometer readout means further includes means for detecting and counting the cyclical interferences between said pair of interferometer beams.

7. An automatic optical caliper for gaging workpieces comprising a laser light source for deriving a single narrow source light beam, a pair of aligned, independently operating optical gage units for automatically seeking opposite edges of the workpiece, each optical gage unit including an optical system including a first mirror element for deriving from said source light beam and projecting a gaging light beam, adjusting means for moving said gaging light beam relative to one edge of the workpiece, a gage photodetector for sensing said gaging light beam and generating an output signal indicative of the intensity thereof, servo feedback control means responsive to said photodetector output signal for actuating said adjusting means and positioning said gaging light beam to be interrupted by the one edge of the workpiece, and optical interferometer readout means for obtaining a measurement dependent on the actual distance between the two gaging light beams when positioned to be interrupted by the opposite edges of the workpiece, said optical interferometer readout means including a beam splitter and a second mirror associated with each optical gage unit for deriving from each gaging light beam an interferometer beam which is reflected back to the associated first mirror element, one of said interferometer beams further being reflected from one of said first mirror elements to the other and combined with the other interferometer beam, and means for detecting and counting the cyclical interferences of the combined interferometer beams.

* * * * *